(12) United States Patent
Park et al.

(10) Patent No.: US 6,336,075 B1
(45) Date of Patent: Jan. 1, 2002

(54) APPARATUS AND METHOD FOR GUIDING A VEHICLE

(75) Inventors: Jong-Hun Park, Kyongki-do; Young-Dal Sin, Inchun-shi; Joong-Hyup Ko, Kyongki-do; Dong-Joon Kim; Seo-Yong Jin, both of Seoul, all of (KR)

(73) Assignee: ROTIS Inc., Seoul (KR)

( * ) Notice: Subject to any disclaimer, the term of this patent is extended or adjusted under 35 U.S.C. 154(b) by 0 days.

(21) Appl. No.: 09/522,712

(22) Filed: Mar. 10, 2000

(51) Int. Cl.$^7$ .................................................. G06G 7/78
(52) U.S. Cl. ..................... 701/211; 701/207; 701/208; 701/117; 340/988; 340/990; 340/995
(58) Field of Search .................................... 701/117, 119, 701/207, 208, 209, 210, 211, 212; 340/901, 903, 905, 991, 992, 993, 995; 73/178 R

(56) References Cited

U.S. PATENT DOCUMENTS

| | | | | |
|---|---|---|---|---|
| 5,428,544 A | * | 6/1995 | Shyu ............................. | 701/117 |
| 5,778,333 A | * | 7/1998 | Koizumi et al. ............. | 701/212 |
| 5,864,305 A | * | 1/1999 | Rosenquist ................... | 340/995 |
| 5,983,161 A | * | 11/1999 | Lemelson et al. ........... | 701/301 |
| 6,046,671 A | * | 4/2000 | Shimoura et al. ............ | 340/439 |

* cited by examiner

Primary Examiner—Jacques H. Louis-Jacques
(74) Attorney, Agent, or Firm—Jacobson Holman, PLLC

(57) ABSTRACT

A method and apparatus for guiding a vehicle in which a transmission signal of a position transmitting device installed at key points on a roadside is received by a position receiving device mounted in the vehicle. The apparatus having members for coding position information on the road where the position transmitting device is installed and traffic information including danger information with respect to the road, storing the same, modulating and continuously transmitting the coded information to the vehicle. Also, the apparatus capable of receiving the transmission signal of a corresponding position while the vehicle is moving on the road, and continuously classifying and searching the information and the intensity of the signal. Another part of the apparatus for detecting the current position of the vehicle either by directly using the searched result or by computing a travel distance of the vehicle. The apparatus for informing the current position of the detected vehicle, its heading position, its advancing the direction, a remaining distance to its destination and danger information for guidance.

13 Claims, 8 Drawing Sheets

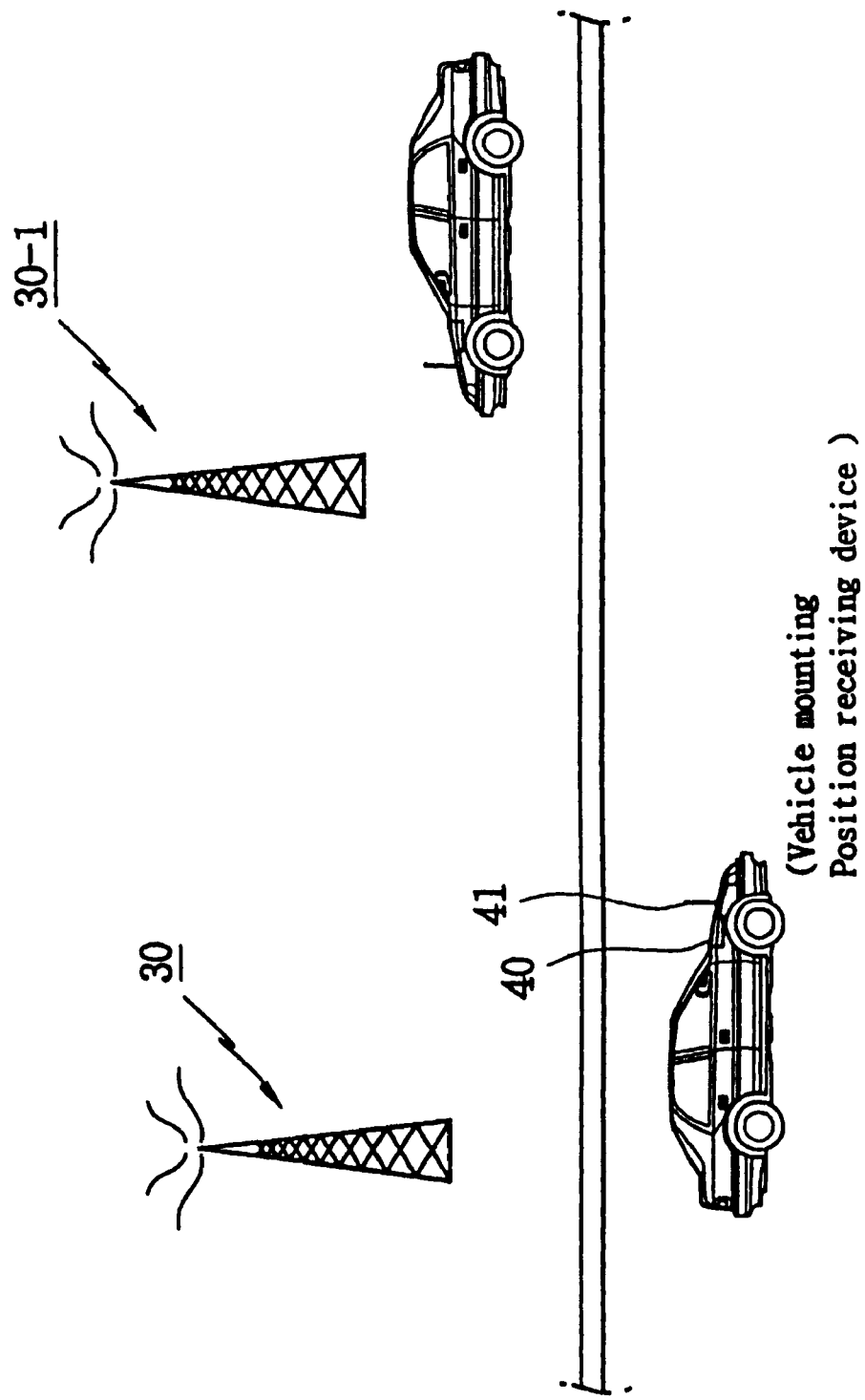

APPARATUS AND METHOD FOR GUIDING A VEHICLE

BACKGROUND OF THE INVENTION

1. Field of the Invention

The present invention relates to a car navigation system, and more particularly, to an apparatus and method for guiding a vehicle which is capable of accurately detecting a position of a vehicle moving on a road regardless of a location or an environment of the road, so that the current position of the vehicle, its advancing direction and a remaining distance to its destination can be informed to a driver through a voice guidance and a graphic display, thereby guiding the vehicle accurately and steadily to an intended destination.

2. Description of the Background Art

In general, a car navigation system is characterized in that positions of roads and facilities on a map are digitized and stored in a memory, and history of current position information on a vehicle is periodically analyzed by using satellites and maps with the roads of the map stored in the memory, thereby guiding the vehicle steadily to the destination within the shortest time.

In most car navigation systems, there is expressed only a simple operation for shortest path selection from an arbitrary starting position to a destination, which does not give the driver any current traffic condition Recently, there has been proposed a method of guiding a car navigation system in which traffic information is received by a data file to thereby search a shortest path for guidance. This method employs a global positioning system (GPS).

The GPS system in use for the traffic information collection system is a space-based satellite radio navigation system developed by the U.S. Department of Defense which includes an intentional error in transmission in order to prevent a military use by other countries.

According to this system, by receiving radio signal transmitted from at least three or four satellites among many GPS satellites having an atomic frequency in the orbit, a distance to the satellites is obtained from the radio time of the radio signals, for which a speed measurement is available by using the Doppler effect of a three-dimensional or two-dimensional lateral position and the radio waves.

As aforementioned, the global positioning system (GPS) was initially developed for military use, as it was confirmed to have a high utility value for civil vehicle means, the satellite started a service for civil use, by transmitting radio signals for measurement which contains the range error.

By applying the global positioning system to the car navigation system, information on a vehicle operation, such as a distance to the destination and the time required, can be obtained.

Typically, the error in the distance signal received from the GPS satellite is approximately in the range of 100 m to 2 km.

FIGS. 1 and 2 show an apparatus for guiding a vehicle using the conventional global positioning system.

The apparatus for guiding a vehicle of the conventional art includes a plurality of GPS satellites 20 placed in a orbit for transmitting a GPS signal including position information and time information on a vehicle; and a GPS receiver 10 mounted in the vehicle for receiving the GPS signals including the position and time information from the plurality of GPS satellites 20, detecting a current position of the moving vehicle by using the GPS signals, and guiding the vehicle to its destination.

As shown in FIG. 2, the GPS receiver 10 includes an antenna 100 for receiving the GPS signal including the position and time information of the vehicle from the plurality of satellites 20; a frequency down converter 101 for frequency down converting the plurality of GPS signals each in the different range of a few GHz(substantially 1–8 GHz) as received to baseband signals; a GPS tuner 102 for extracting only a GPS signal corresponding to the current position of the vehicle from the frequency down converted baseband signals; a position operation unit 103 for computing an absolute coordinate of a latitude, a longitude, an altitude, and a standard time with the extracted GPS signal and outputting current position information on the vehicle; a compact disk player 106 having a disk ROM storing digitized positions of roads and facilities of a map; an operating panel 107 for inputting a position of a starting position or a destination; a CPU 105 for analyzing history of position information transmitted periodically from the position operation unit 103 to correct a position measurement error, and mapping the current position of the vehicle to each road on the map as stored in the disk ROM of the compact disk player 106; and a monitor 104 for displaying drive guide information outputted from the CPU 105 on a screen until it reaches a destination designated by the operating panel 107.

FIG. 3 is a flow chart of the process of the method for guiding a vehicle in which the GPS signal transmitted from the GPS satellites 20 is received, by which the current position of the vehicle is computed, and the computed current position of the vehicle is mapped onto the road of the map stored in the disk ROM of the compact disk player 106, thereby guiding the vehicle to its destination through the shortest path.

The operation of the apparatus for guiding a vehicle using the global positioning system in accordance with the conventional art will now be described with reference to FIG. 3.

When the car navigation system adapting the global positioning system is started to be operated, the CPU 105 actuates the compact disk player 106. Accordingly, the compact disk player 106 loads the map stored in the disk ROM as digitized and displays it on the screen of the monitor 104 through the CPU 105.

When positions of the roads and the facilities of the map is displayed on the screen of the monitor 104, a driver inputs a desired destination through the operating panel 107 (step S10).

At this time, the plurality of GPS satellites 20 placed in the orbit, that is, the 24 GPS satellites, transmits the GPS radio waves including the position and time information of the vehicle.

The GPS radio waves transmitted from the plurality of satellites 20 are received by the GPS receiver 10 mounted in the vehicle as shown in FIG. 1.

As shown in FIGS. 1 and 2, the GPS receiver 10 mounted in the vehicle receives the radio waves from at least three or four GPS satellites 20 (preferably three GPS satellites) among the plurality of GPS satellites 20 through a radio wave receiver such as the antenna 100, and supplies them to the frequency down converter 101.

The frequency down converter 101 frequency down converts the received GPS radio waves of a few GHz to baseband signals and supplies the same to the GPS tuner 102.

The GPS tuner 102 extracts only a corresponding baseband signal that is the most suitable to its position among the baseband signals for each GPS signal inputted through the frequency down converter 101.

The position operation unit 103 computes the current position of a vehicle, that is, a latitude, a longitude, an altitude and the standard time, on the basis of respective baseband signals inputted through the GPS tuner 102, and provides it to the CPU 105 (to be described later).

As is known, the GPS signal is a signal transmitted from the plurality of GPS satellites 20 having time information. Arrival time taken for the radio waves to reach the vehicle from the respective GPS satellite 20 is different to each other due to the difference of the distance from each GPS satellite to the vehicle.

By comparing the GPS signal arrival time from each GPS satellite pre-set over a reference coordinate corresponding to a specific position and a GPS signal arrival time from each GPS satellite received at a position of a specific position, an absolute coordinate value of the current specific vehicle can be obtained.

Accordingly, the CPU 105 reads out the current position information on the vehicle which was arithmetically operated by the position operation unit 103 and map-matches it with the road on the map as stored in the disk ROM of the compact disk player 106, so that the driver can recognize the current vehicle position and inputs a starting position through the operating panel (stage: ST11).

Accordingly, as the starting position is set, the CPU 105 receives various traffic data continuously and periodically as transmitted and displays them on the screen of the monitor 104 (stage: ST12).

In this respect, the CPU 105 searches the shortest path on the basis of the traffic data (stage: ST13) and displays it on the screen of the monitor 104.

When the vehicle starts moving along the path from the starting position (stage: ST15), the CPU 105 corrects an error of the position information periodically inputted from the position operation unit 103 and computes an average speed on the basis of an average time according to the moving distance for a predetermined time.

And, the CPU 105 analyzes the history of the position information, and periodically performs an arithmetic operation and numerical operation for map-matching the current position of the vehicle with the route of the map, and then displays it on the screen of the monitor 104.

Also, the CPU 103 continuously searches the data inputted from the numerical operating unit 103 so as to judge whether any abnormal situation occurs during driving (stage: ST16).

In case that an abnormal situation occurs, the CPU 103 searches again the shortest path on the basis of the received data and provides the driver with new information (stage: ST17).

Such processing is continuously performed according to a predetermined order until the driver reaches a destination set through the operating panel 107 (stage: ST18).

According to the method for guiding a vehicle using the global positioning system of the conventional art, the current position of the vehicle is computed by receiving the radio waves from at least three satellites among the plurality of GPS satellite placed in the orbit, and the history of the computed position information is analyzed so as to be map-matched with the route of the map as stored, thereby guiding to the destination.

However, the method for guiding a vehicle using the global positioning system of the conventional art has the following problems when the current position of the vehicle is detected and guided for traveling.

First, since the error is intentionally included for transmission from the GPS satellite, in case that the position is sensed by using the GPS receiver, the position error is wide-ranged from 100 m to 2 km, making it difficult to detect an accurate position of the vehicle.

Secondly, a complicate logical operation and numerical computation should be performed for additionally correcting the position error.

Thirdly, regarding the fact that the current position of the vehicle is computed by receiving the radio waves from at least three or four satellites among the plurality of GPS satellites placed in the orbit, since less than four satellite can be available for simultaneously receiving by the vehicle in such an area where there is a tunnel, or in a mountainous area, or in the downtown area where there are many tall buildings, the accurate position of the vehicle is hardly detected.

Lastly, the GPS receiver including an attachment such as the disk ROM player must be installed in the vehicle: however, it is very costly, and as the vehicles installing it are increased in number, a considerable expense is inevitably consumed, resulting in an unwanted situation against the low-cost transportation policy.

In addition, use of a differential GPS may be considered as one method for avoiding such a measurement error which occurs when the absolute coordinate of the vehicle is computed by using the GPS radio waves, which, however, also requires additional apparatus and increases in the expense.

SUMMARY OF THE INVENTION

Therefore, an object of the present invention is to provide an apparatus and method for guiding a vehicle which is capable of steadily guiding a vehicle by accurately identifying a position of a vehicle on a road regardless of a location or an environment of the road, without any complicate logical operation and numerical computation for correcting a position error, and without an increase in the expense due to any additional attachment such as a disk ROM player.

Another object of the present invention is to provide an apparatus and method for guiding a vehicle which is capable of continuously tracing the current position of a moving vehicle without a position error even in a bad condition where GPS satellite radio waves are hardly received.

Still another object of the present invention is to provide an apparatus and method for guiding a vehicle which includes a position transmitter installed on road and a position receiver mounted in a vehicle so as to accurately detect the current position of a vehicle by using a wireless communication network without using GPS satellite radio waves.

Yet another object of the present invention is to provide an apparatus and method for guiding a vehicle which is capable of informing a user of the current position of a vehicle, an advancing direction, a remaining distance to destination or warning the user of any dangerous matters on or near a road by voice guidance or graphic display, so that a user can safely drive to the destination.

To achieve these and other advantages and in accordance with the purpose of the present invention, as embodied and broadly described herein, there is provided a method for guiding a vehicle including: an installing a position transmitting device at key points of roadside, receiving position information and danger information on the road through a traffic information network, coding the same, and modulating and continuously transmitting the coded information to a vehicle; an information collecting step of receiving signal of a corresponding position of the vehicle moving on the road, continuously classifying and searching the information and the intensity of the signal as received; a position detecting step either by directly using the searched result without computation or by computing a travel distance of the vehicle; and a guide step of informing of the current position, an advancing direction of the vehicle and a remaining distance to its destination or danger information for guidance.

In order to attain the above object, there is also provided an apparatus for guiding a vehicle including a position transmitting device installed at key points on a road to transfer service information and a position receiving device mounted in a moving vehicle to receive the service information so as to guide the vehicle, wherein the position transmitting device includes: an interface unit for receiving traffic information for service to a vehicle moving on a road from a traffic information network; a memory for storing position information on the road and the traffic information received from the interface unit as code valued; a first communication module for modulating the position information and the traffic information as coded and stored in the memory and transmitting the same to each vehicle moving in the vicinity of the road through an antenna; and a first microprocessor for coding the position information on the road and the traffic information obtained by the interface unit, providing it to the memory, and controlling the transmitting operation of the first communication module and the receiving operation of the traffic information according to a due order, and the position receiving device includes: a second communication module for receiving the signal as modulated by the position transmitting device through the antenna, classifying the information and intensity of the signal from the received signal, and outputting the same; an analog-to-digital converter for digitizing the intensity of the signal as classified by the second communication module; a travel distance detector for measuring a travel distance of the vehicle and generating a pulse in proportion to the measured travel distance; a second microprocessor for detecting the current position of the vehicle on the basis of the information as classified by the second communication module, the digital value according to the intensity of the signal and the measured pulse, analyzing the data to output a corresponding position information, travel information and danger information, and periodically controlling the operation of the second communication module; and an information output unit for visually and acoustically guiding the position information, the travel information and the danger information as obtained by the second microprocessor.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 4 is an exemplary concept view of the apparatus for guiding a vehicle in accordance with the present invention;

FIGS. 5A and 5B are detailed block diagrams of the apparatus for guiding the vehicle of FIG. 4 in accordance with the present invention, in which;

FIG. 5A is a block diagram of a position transmitting device installed at key points on a road for transferring position information; and FIG. 5B is a block diagram of a position receiving device mounted in a vehicle for receiving information of the position transmitting device;

FIGS. 6A and 6B are signal flow charts of the method for guiding the vehicle in accordance with the present invention, in which;

FIG. 6A is a signal flow chart of an operation of the position transmitting device of FIG. 5A; and FIG. 6B is a signal flow chart of an operation of the position receiving device of FIG. 5B.

DETAILED DESCRIPTION OF THE PREFERRED EMBODIMENTS

Figure 1:
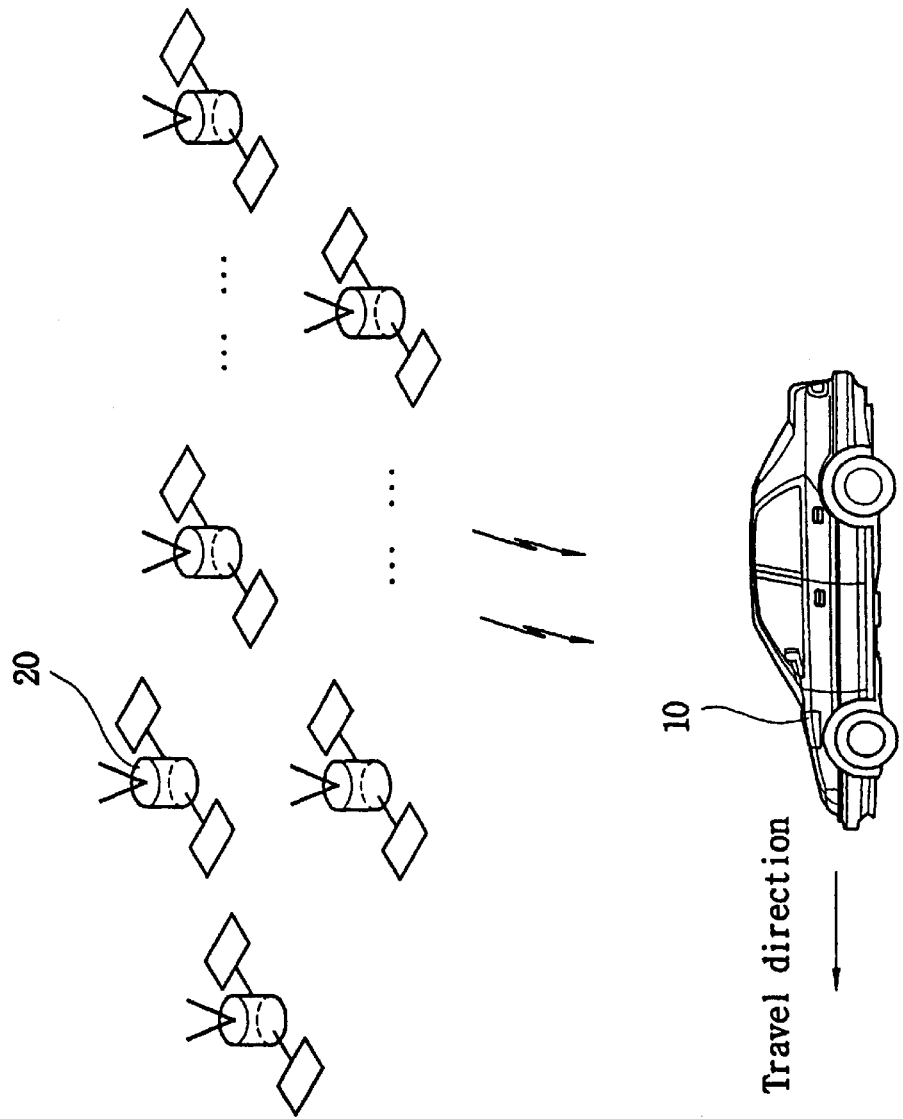
FIG. 1 is a concept view of a car navigation system in accordance with a conventional art.
Figure 2:
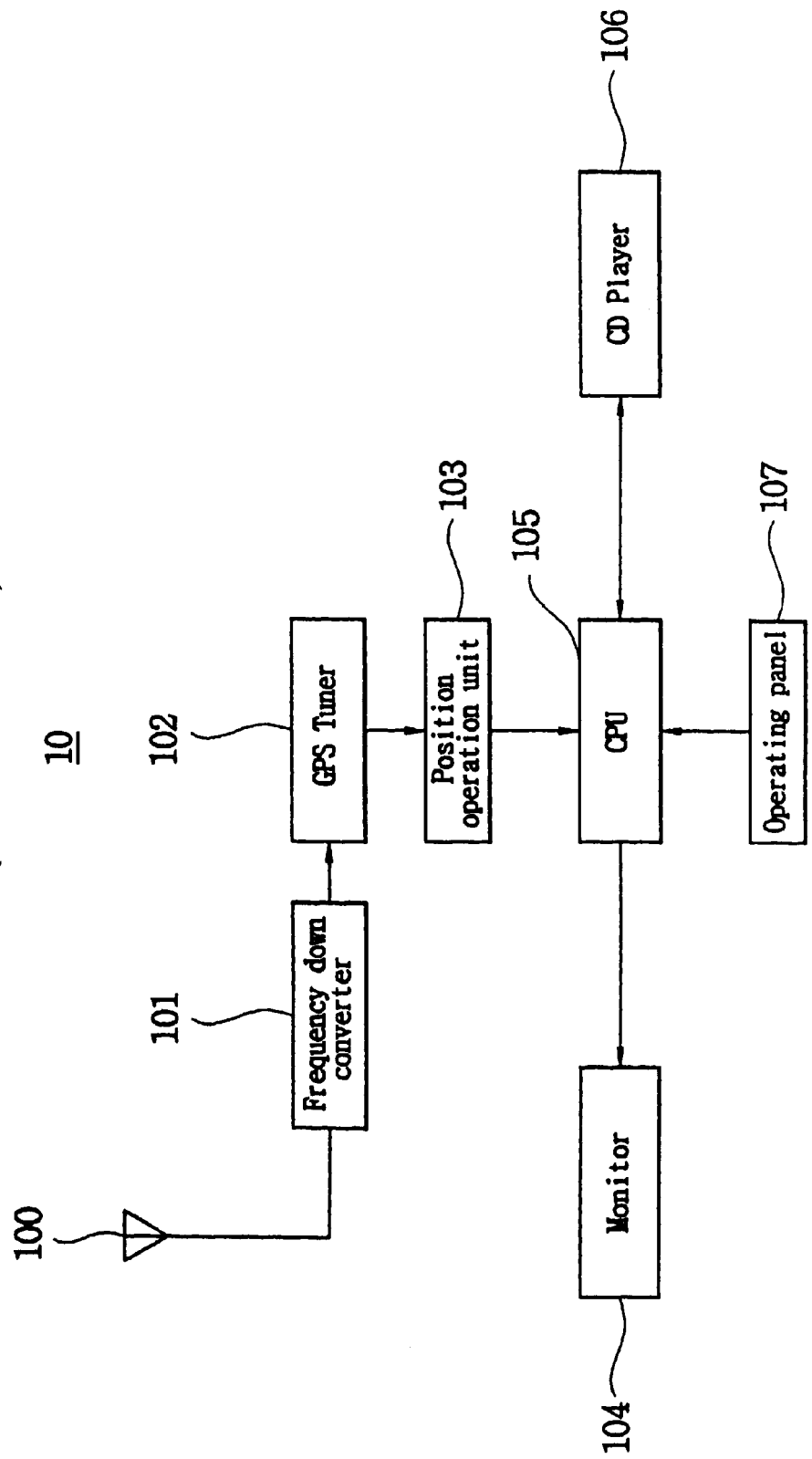
FIG. 2 is a block diagram of an apparatus for guiding a vehicle using a global positioning system in accordance with the conventional art.
Figure 3:
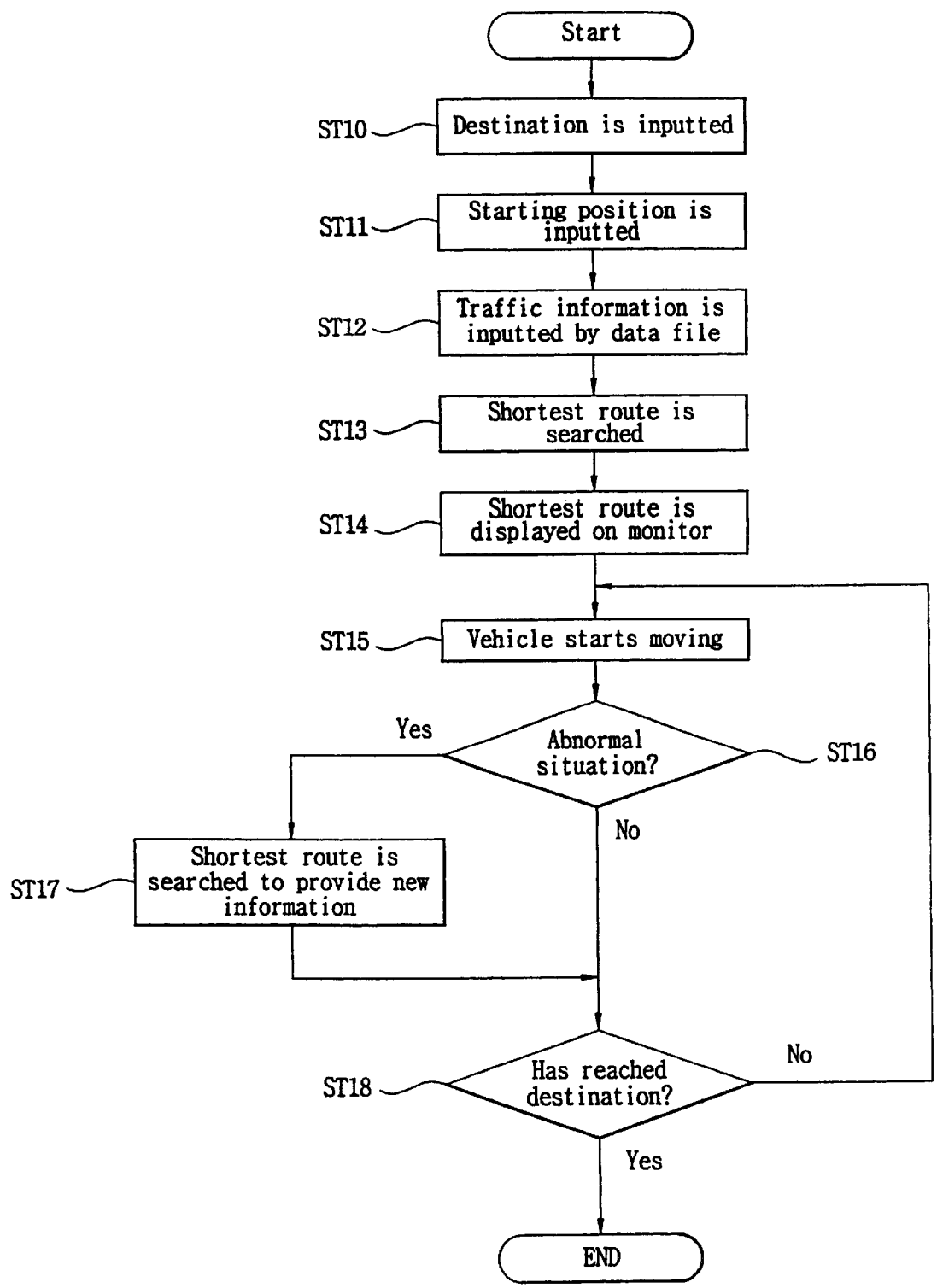
FIG. 3 is a signal flow chart of a method for guiding a vehicle of FIG. 2 in accordance with the conventional art.

Reference will now be made in detail to the preferred embodiments of the present invention, examples of which are illustrated in the accompanying drawings.

The technique of the present invention is applicable to various navigation systems for guiding a vehicle to safely it to its destination.

Accordingly, illustrations of FIGS. 4 through 6B show an exemplary navigation system to explain the present invention.

Regarding each illustration, the same elements are given the same reference numerals.

In the forthcoming description, the apparatus and method for guiding a vehicle is considered to be applied to a car moving on a road.

The apparatus for guiding a vehicle in accordance with the present invention broadly includes a plurality of position transmitting devices 30 and 30-1 installed in key points of roadside and wirelessly transferring its own ID number or an absolute coordinate value of its own position, and traffic information including danger matters; and a position receiving device 40 mounted in the vehicle traveling on the road for receiving the signal transmitted by the position transmitting devices 30 and 30-1, detecting the current position of the vehicle moving on the road, and informing a driver of traffic information including danger matters.

Figure 5A:
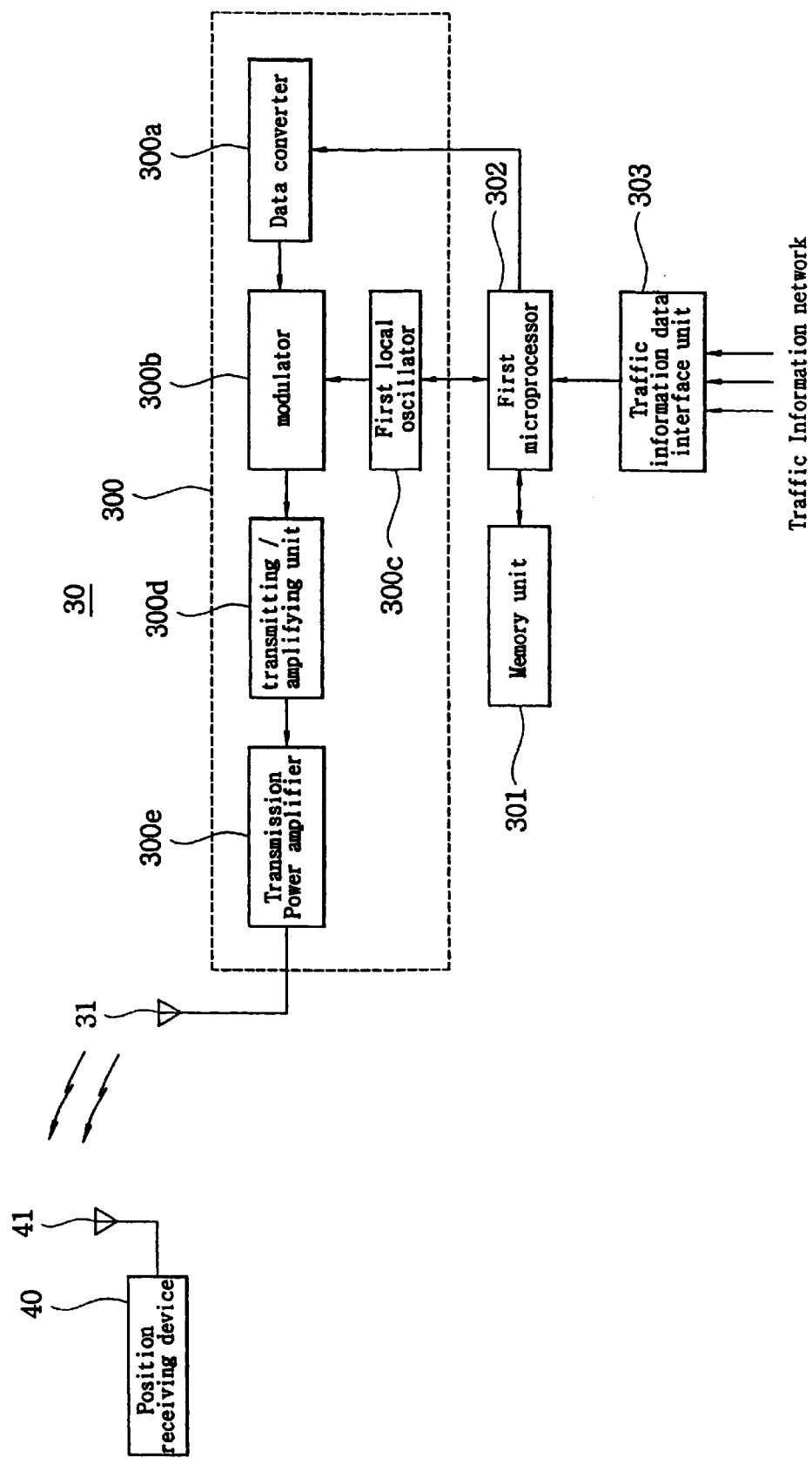

As shown in FIG. 5a, the position transmitting device 30 includes an interface unit 303 for receiving traffic information for service to the vehicle moving on the road from a traffic information network and signal-processing it; a memory unit 301 for receiving code values of the identification (ID) number of a corresponding position transmitting device 30 installed at key points of roadside or an absolute coordinate value for the position of the position transmitting device 30 and the traffic information through the interface unit 303 and storing the same; a first communication module 300 for modulating the position information and traffic information stored in the memory unit 301 and transmitting the same to each vehicle moving in the vicinity of the road through an antenna 31; and a first microprocessor 302 for coding the position information and the traffic information inputted from the interface unit 303, providing the coded information to the memory 301, and controlling entire operation of the first communication module 300.

The first communication module 300 includes a data converter 300a for receiving the position information and the traffic information as coded and stored in the memory unit 301 from the first microprocessor 302, converting them to a bit stream, and outputting the same; a first local oscillator 300c for generating an oscillation frequency under the control of the microprocessor 302; a modulator 300b for modulating the bit stream inputted upon conversion from the data converter 300a to the frequency of the first local oscillator 300c and outputting the same; a transmitting/amplifying unit 300d for amplifying the modulated signal to a sufficient amplitude; and a transmission power amplifier 300e for power-amplifying the amplified transmission signal to a sufficient intensity and transmitting it through the antenna 31.

Figure 5B:
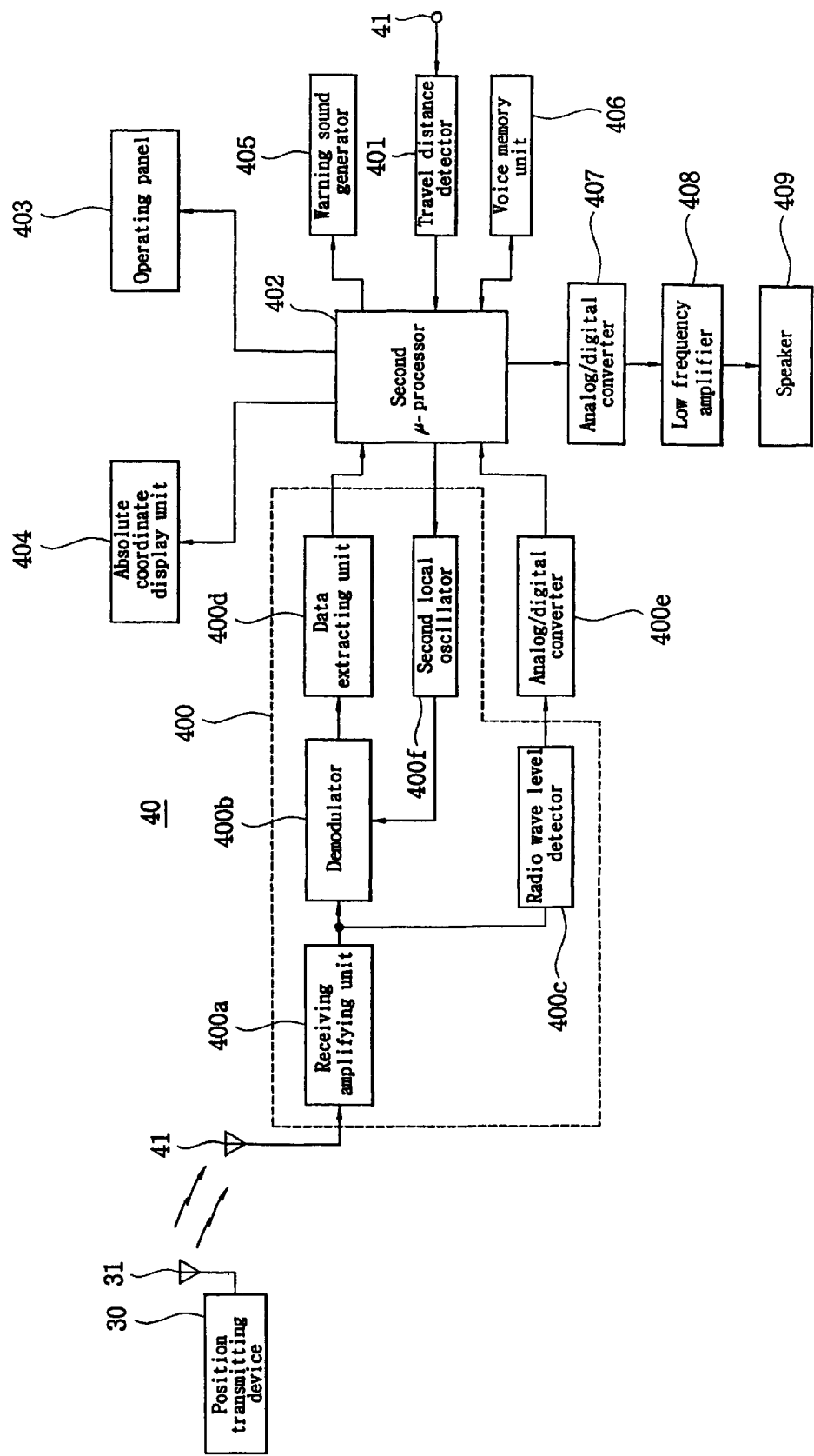

As shown in FIG. 5B, the position receiving device 40 of the vehicle moving on the road includes a second communication module 400 for receiving the modulated transmission signal from the corresponding position transmitting device 30 and classifying and detecting the position information, the traffic information and the intensity of the signal from the received signal; an analog-to-digital converter 400e for converting the intensity of the received signal as classified and detected by the second communication module 400 to a binary-coded data and outputting the same; a travel distance detector 401 for receiving pulses generated according to the travel distance of the vehicle through an input terminal 410, computing them, and outputting the same; a second microprocessor 402 for controlling the operation of the second communication module 400 in receiving, detecting the current position of the vehicle on the basis of the position information classified and detected by the second communication module 400, the level of the received signal inputted upon conversion from the analog-to-digital converter 400e and the count value of the travel distance detector 401, and judging the traffic information to periodically generate the position information, the travel information and the danger information; a voice memory unit 406 for generating a data in voice for the position information, the travel information and the danger information under the control of the second microprocessor 402; a digital-to-analog converter 407 for converting the data in voice generated by the voice memory unit 406 to an analog signal; a low frequency amplifier 408 for low-frequency amplifying the converted analog signal and outputting it in voice through a speaker 409; a warning sound generator 405 for generating a warning sound for the danger information under the control of the second microprocessor 402; an absolute coordinate display unit 404 for displaying the position information, the travel information and the traffic information by a graphic display under the control of the second microprocessor 402; and an operation panel 403 for selecting a destination or a route on roads and providing it to the second microprocessor 402.

The second communication module 400 includes a receiving/amplifying unit 400a for receiving the transmission signal from the corresponding position transmitting device 30 and amplifying it; a demodulator 400b for demodulating the position information and the traffic information including the danger information amplified from the said receiving/amplifying unit to its original signals by the oscillation frequency; a data extracting unit 400d for detecting the position information and the traffic information including the danger information demodulated from the demodulator and for providing them to the second microprocessor 402; the second local oscillator 400f for generating an oscillation frequency under the control of the second microprocessor 402; and a radio wave level detector 400c for detecting a level of the received signal amplified by the receiving/amplifying unit 400a and for providing it to the analog-to-digital converter 400e.

Figure 6A:
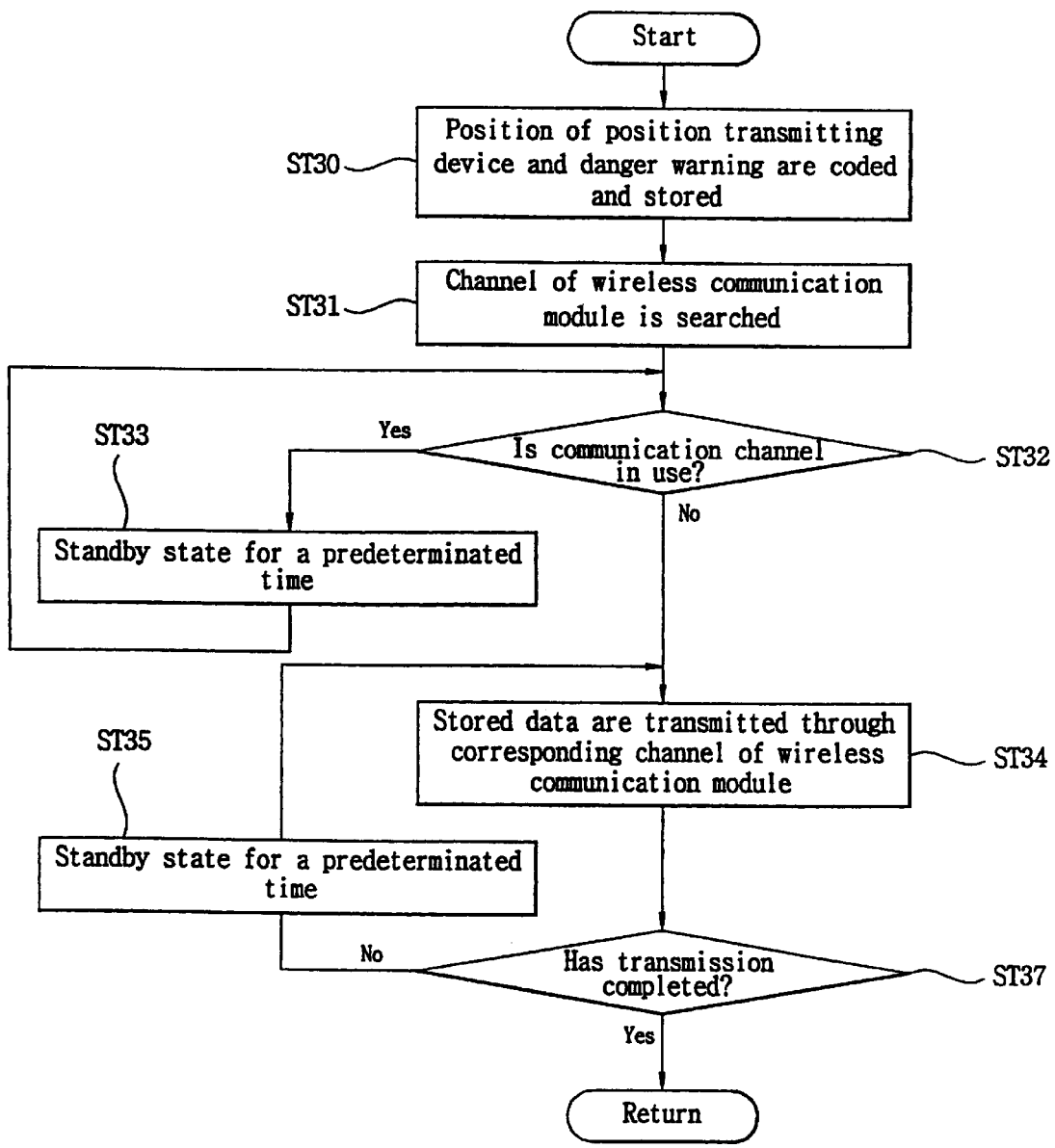
Figure 6B:
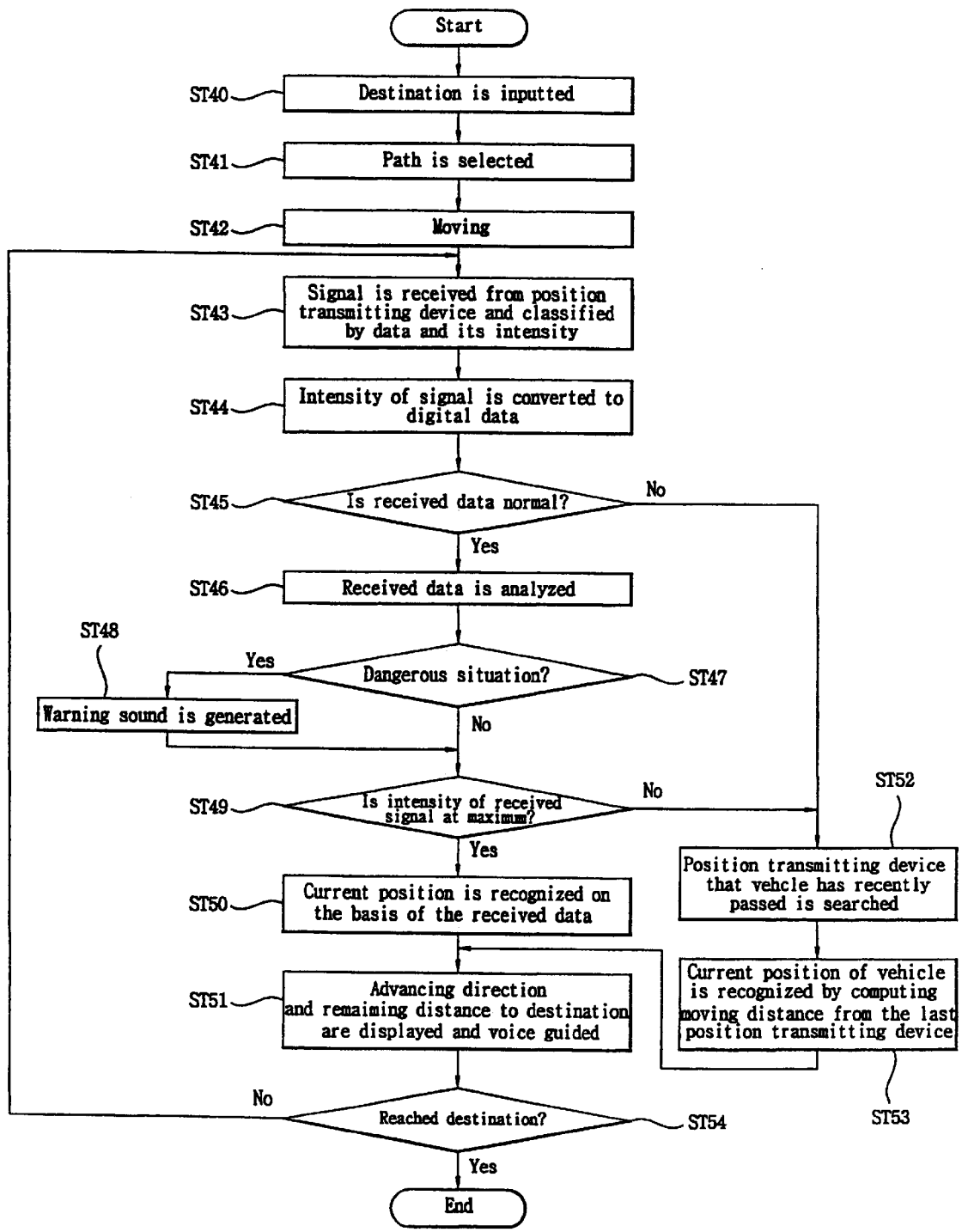

FIG. 6A is a signal flow chart of a process of the position transmitting device 30 installed in a key points on a roadside that modulates its own position information and traffic information and transmits it to a vehicle moving in the vicinity of the road, and FIG. 6B is a signal flow chart of a process of the position receiving device 40 mounted in the vehicle that receives the signal from the position transmitting device 30 of FIG. 6A and informs the driver of the current position, the travel direction and the travel method by graphic display or a voice guidance.

The operation of the apparatus for guiding a vehicle in accordance with the present invention constructed as described above will now be explained with reference to FIGS. 4 through 6B.

A plurality of position transmitting devices 30 and 30-1 installed at key points on a roadside start operating. Accordingly, the interface unit 303 receives traffic information, i.e., danger matters in respect of the road, etc., for service to the vehicle from a traffic information network and provides it to the microprocessor 302.

The first microprocessor 302 codes the traffic information as inputted and stores it in a data recording unit such as a non-volatile memory unit 301 (stage: ST30).

In this respect, the position information of a corresponding position transmitting device 30, that is, its own ID number or an absolute coordinate value (the latitude, the longitude and the altitude) is previously coded in the non-volatile memory unit 301.

In the state that the position information and the traffic information including the danger matters are already coded and stored, the first microprocessor 302 searches a channel of the first communication module 300 so as to transmits the information through the communication channel (stage: ST31).

And, upon judging whether the searched channel is in use or not (stage: ST32), if the searched communication channel is in use, that is, the position information and the traffic information are currently being transmitted, the first microprocessor 302 is in a standby state until the communication channel becomes idle, that is, until the transmission content is completed (stage: ST33).

The reason for this is that the position transmitting device 30 transmits the position information and the traffic information stored in the memory unit 301 periodically and repeatedly. Accordingly, as a transmission content of one cycle is completed, the same transmission content is transmitted again. In this respect, in order to judge whether transmission of one cycle of transmission content is completed, the first microprocessor 302 periodically searches the communication channel.

If the communication channel is in idle state at step ST32, the first microprocessor 302 controls the first local oscillator 300c of the first communication module 300 so as to transmits the transmission contents, and reads out the position information and the traffic information stored in the memory unit 301 and provides them to the data converter 300a.

The position information and the traffic information outputted from the first microprocessor 302 are converted to a bit stream by the data converter 300a, mixed with the oscillation frequency of the first oscillator 300c in the modulator 300b, and amplified to a sufficient amplitude through the transmitting/amplifying unit 300d of the first communication module, and then supplied to the transmission power amplifier 300e.

The transmission power amplifier 300e power-amplifies the modulated transmission signal to a sufficient intensity and transmits it onto the road through the antenna 31 (stage: ST34), and is in a standby state for a predetermined time until the transmission is completed (stage: ST35).

Thereafter, upon judging whether the transmission is completed (stage: ST36), if the transmission is underway, the process after the step (ST34) is repeatedly performed, while if the transmission was completed, the position information and the traffic information are continuously transmitted through the communication channel.

The transmission signal transmitted from the position transmitting device 30 is received by the vehicle moving on the adjacent road where the position transmitting device 30 is installed, that is, by the position receiving device 40 of the corresponding vehicle.

Meanwhile, as shown in FIG. 5B, the position receiving device 40 detects the current position of the vehicle and informs the driver of it visibly and acoustically, and analyzes the traffic information on the basis of the transmission signal so as to inform the driver of the danger information and movement direction and traveling method for the vehicle relying on the danger information.

Detailed description for the position receiving device 40 will now be described with reference to FIGS. 5B and 6B.

First, in case that it is desired to be informed of a movement direction and a traveling method of the vehicle through the position receiving device 40, the driver sequentially inputs a desired destination and a route through the operation panel 403 (stages: ST40 and ST41).

As the destination and the route are inputted, the second microprocessor 402 (to be described later) of the position receiving device 40 is actuated to memorize the corresponding destination and the route, and accordingly, the second communication module 400 is actuated.

When the vehicle is moving to the adjacent area where the position transmitting device 30 is installed (stage: ST42), the antenna 41 of the position receiving device 40 mounted in the vehicle receives the transmission signal of the nearest position transmitting device among the transmission signals (radio frequency signal) of the plurality of position transmitting devices installed at every points on the roadside.

The received signal is noise-filtered and amplified to a sufficient amplitude as high as a pre-set amplification level by the receiving/amplifying unit 400a of the second communication module 400 and shunted to the modulator 400b and the radio wave level detector 400c.

The received signal as amplified and inputted are mixed with the oscillation frequency of the second local oscillator 400f in the demodulator 400b, and demodulated to its original information and supplied to the data extracting unit 400d.

The position information denotes either the ID number of each position transmitting device or the value of the absolute coordinate (the attitude, the longitude and the altitude) of the position transmitting device, which will be referred to as position information hereinafter.

The data extracting unit 400d of the second communication module 400 extracts information for service to the vehicle i.e., only the position information transmitted from the corresponding position transmitting devices device 30 and the traffic information including the danger information (stage: ST43) and supplies it to the second microprocessor 402.

The radio wave level detector 400c of the second communication module 400 detects the intensity of the received signal as amplified and inputted from the receiving/amplifying unit 400a, that is, the intensity of the radio from the position transmitting device 30 (stage: ST43), converts them to a numerical data through the analog-to-digital converter 400e, and supplies them to the microprocessor 402.

In this respect, the amplitude of the received signal becomes larger as the vehicle comes near the position transmitting device 30.

In that manner, the signal intensity of the position transmitting device 30 is successively monitored by the second microprocessor 402.

Upon receipt of the intensity of the signal and the information after being classified and detected through the second communication module 400, the second microprocessor 402 judges whether the information (position information and the traffic information) received through the data extracting unit 400d is normal (stage: ST45).

If it is judged that the information was received normally at the stage (ST45), the traffic information out of the received information is analyzed (stage: ST46) to determine whether any dangerous situation occurred on or near the road where the corresponding position transmitting device 30 was installed (stage: ST47).

At the stage ST47, if a dangerous situation occurred, that is, there included a danger information in the traffic information, the second microprocessor 402 drives the warning sound generator 405 to generate a warning sound (stage: ST48) and reads out the data in voice for the danger matters from the voice memory unit 406 to inform the driver of it by means of the voice information guiding unit such as the digital-to-analog converter 407, the low frequency amplifier 408 and the speaker 409.

Meanwhile, if no dangerous situation occurred at the step ST47, the intensity value of the signal successively detected by the analog-to-digital converter 400e is judged (stage: ST49), so that the current position of the vehicle is detected by using the position information transmitted from the position transmitting device 30, the nearest one, as the vehicle approaches.

In this respect, according to the intensity of the signal and the information as received, the second microprocessor 402 detects the current position of the vehicle to let the driver know visibly and acoustically under the following two conditions:

One is that if the information received at the step S45 is normal, and the intensity of the received signal detected at the step S49 is the maximum, that is, when the vehicle nears most closely the corresponding position transmitting device 30, the current position of the vehicle is detected on the basis of the position information transmitted from the corresponding position transmitting device 30 out of the received information, that is, on the basis of the ID number of the position transmitting device 30, or on the basis of the absolute coordinate value (stage: ST50).

Another one is that if the received information is not normal or the intensity of the received signal is weak, a travel distance is obtained on the basis of the pulse value of the travel distance detector 401 (to be described), thereby detecting the current position of the vehicle.

The second case is caused when the vehicle in moving is positioned between the position transmitting device 30 and the position transmitting device 30-1.

In this case, since the signals respectively transmitted from the two position transmitting devices 30 and 30-1 are received by the position receiving device 40 of the vehicle, the second microprocessor 402 judges the received information as an abnormal one. And, since the vehicle is positioned in the middle of the two position transmitting devices, not nearing either one of the two position transmitting devices, the intensity of the signal is detected very weakly.

In case that the second condition is satisfied as the vehicle is positioned between the position transmitting devices 30 and 30-1, the second microprocessor 402 searches the position transmitting device that it has passed most recently (stage: ST52).

And then, on the basis of the position transmitting device that the vehicle has passed most recently, the travel distance is computed to thereby detect the current position of the vehicle (stage: ST53).

In other words, the travel distance detector 401, like a travel distance metric system, counts the predetermined number of pulses inputted from an input terminal 410 whenever the wheel of the vehicle is rotated by one time and provides the same to the second microprocessor 402. Then, the second microprocessor 402 computes the travel distance 'd' according to a proportional expression of the number of the inputted pulse and the circumference of the wheel of the vehicle.

For example, in case that four pulses are outputted from the travel distance detector 401 when the wheel of the vehicle is rotated by one time, the following equation is obtained: Travel distance ('d')=n×I×1/m=n×I×¼, wherein 'n' indicates the total number of the pulses of the travel distance, 'I' indicates the circumference of the wheel of the vehicle, 'm' indicates the number of the pulse generated when the wheel of the vehicle is rotated by one time.

In that manner, the current position of the vehicle is detected by the travel distance 'd' obtained on the basis of the position transmitting device that the vehicle has passed most recently.

When the current position is detected through one of the two conditions, the second microprocessor 402 displays the current position of the vehicle, an advancing direction according to selection of a route, a remaining distance to the destination by means of a graphic information guide unit such as the absolute coordinate display unit 404, and reads out the data in voice corresponding to the information from the voice memory unit 406 so as to inform the driver of the same through the digital-to-analog converter 407, the low frequency amplifier 408 and the speaker 409 by voice (stage: ST51).

Such process is continuously performed in a due order until the driver reaches his or her destination as set through the operation panel 403.

Comparatively, unlike in the conventional art in which the radio waves are received from the plurality of GPS satellites placed in the orbit, based on which the current position of the vehicle is detected through a complicate logical operation and numerical computation, and the detected position is map-matched on the route of the map as stored in the disk ROM for the purpose of guiding the vehicle, in the present invention, the position information of the position transmitting device and the danger matter with respect to the road are wirelessly transmitted from the position transmitting devices installed at key points on roadside, which is received by the position receiving device of the vehicle moving on the road, so that the current position of the vehicle is detected without any complicate computation and is advised visibly and acoustically.

As a result, according to the present invention, the problem of the distance error and unavailability of the signals from the GPS satellite in invisible areas are resolved. Also, by informing the system of the dangerous region and the dangerous matters during the travel visibly and acoustically, the possible occurrence of incidents depending on the situation of the road can be minimized.

As so far described, according to apparatus and method for guiding a vehicle adapting the car navigation system, by using the position transmitting devices installed at key points on roadside and the position receiving device mounted in the vehicle, the current position of the vehicle moving in the adjacent region of the position transmitting device is accurately detected for guidance, without an absolute coordinate computation, so that there don't occur such an error in the measured distance as in the case of the GPS satellites and the GPS receiver, and unavailability of traffic information in the invisibility area as in the conventional art.

By employing the technique of the present invention, since the movement direction and the traveling method are advised visibly and acoustically by accurately receiving and detecting the position information and the traffic information of the position transmitting devices installed at key points on the roadside without error, the reliability of the navigation system is highly improved, and accordingly, a relatively low-cost navigation system can be realized in comparison to the capacity.

Therefore, owing to the apparatus and method for guiding a vehicle, the vehicle is accurately guided for travel regardless of the position of the road or the environment of the road.

Also, since the GPS satellites and the GPS satellite receiver are not used, the driver can travel accurately and steadily to his or her destination at the low expense.

In addition, since the position information is received from the traffic information including the danger information, thereby informing visibly and acoustically, any possibility of incidents can be prevented and the accompanying expense is remarkably reduced.

What is claimed is:

1. A method for guiding a vehicle in which a transmission signal of a position transmitting device installed at key points on a roadside is received by a position receiving device mounted in the vehicle, comprising the steps of:

receiving traffic information for service to a vehicle moving on a road from a traffic information network;

receiving position information on the road and the traffic information received from an interface unit as code values and storing the same;

modulating the position information and the traffic information as coded and stored in a recording unit, and wirelessly transmitting the same to each vehicle moving in the vicinity of the road;

coding the position information on the road and the traffic information obtained by the interface unit, providing it to a recording unit, and controlling the transmitting operation of a first communication module and the receiving operation of the traffic information;

receiving the transmission signal as modulated by the position transmitting device, classifying the information and the intensity of the signal from the received signal, and outputting the same;

digitizing the intensity of the transmission signal as classified by the second communication module;

measuring a travel distance of the vehicle and generating pulses in proportion to the measured travel distance;

detecting the determined current position of the vehicle on the basis of the information as classified by a second communication module, the digital value according to the intensity of the signal and the measure pulse, analyzing the data to output a corresponding position information, travel information and danger information, and periodically controlling the operation of the second communication module; and visually and acoustically guiding the position information, the travel information and the danger information obtained by a second microprocessor.

2. The method according to claim 1, wherein the received information and the intensity of the received signal are normal, the current position of the vehicle is detected by the first condition.

3. The method according to claim 2, wherein, in the first condition, the current position of the vehicle is detected only by the position information of the corresponding position transmitting device according to the intensity of the signal of the position transmitting device.

4. The method according to claim 1, wherein the position information is one of an absolute coordinate value of the position transmitting devices installed at key points on the roadside or an identification number thereof.

5. The method according to claim 1, wherein if either one of the state of the received information and the intensity of the received signal is abnormal, the current position of the vehicle is detected by the second condition.

6. The method according to claim 5, wherein the current position of the vehicle is detected by computing the travel distance of the vehicle on the basis of a position transmitting device that the vehicle has passed most recently.

7. An apparatus for guiding a vehicle including a position transmitting device installed at key points on a roadside for transmitting its own position information and traffic information, and a position receiving device mounted in the vehicle for receiving the position information and the traffic information as transmitted, wherein the position transmitting device comprising:
an interface unit for receiving traffic information for service to a vehicle moving on a road from a traffic information network;
a recording unit for receiving position information on the road and the traffic information received from the interface unit as code values and storing the same;
a first communication module for modulating the position information and the traffic information as coded and stored in the recording unit, and wirelessly transmitting the same to each vehicle moving in the vicinity of the road; and
a first microprocessor for coding the position information on the road and the traffic information obtained by the interface unit, providing it to the recording unit, and controlling the transmitting operation of the first communication module and the receiving operation of the traffic information according to a due order; and the position receiving device comprising:
a second communication module for receiving the transmission signal as modulated by the position transmitting device, classifying the information and the intensity of the signal from the received signal, and outputting the same;
an analog-to-digital converter for digitizing the intensity of the transmission signal as classified by the second communication module;
a travel distance detector for measuring a travel distance of the vehicle and generating pulses in proportion to the measured travel distance;
a second microprocessor for detecting the current position of the vehicle on the basis of the information as classified by the second communication module, the digital value according to the intensity of the signal and the measure pulse, analyzing the data to output a corresponding position information, travel information and danger information, and periodically controlling the operation of the second communication module; and
an information guiding unit for visually and acoustically guiding the position information, the travel information and the danger information obtained by the second microprocessor.

8. The apparatus according to claim 7, wherein the first communication module includes:
a data converter for converting the position information and the traffic information coded and stored in the recording unit to a bit stream and outputting it;
a modulator for modulating the converted bit value and outputting it; and
a transmission power amplifier for power-amplifying the modulated signal and transmitting it.

9. The apparatus according to claim 7, wherein the second communication module includes:
a receiving/amplifying unit for receiving the signal from the first communication module and amplifying it;
a demodulator for demodulating the extracted information
a data extracting unit for extracting the position information and the traffic information from the amplified signal and providing it to the second microprocessor; and
a radio wave level detector for detecting the intensity of the received signal as amplified and providing it to the analog-to-digital converter.

10. The apparatus according to claim 7, further includes a warning sound generator for generating a warning sound under the control of the second microprocessor, so as to inform a driver of danger matters with respect to the road.

11. The apparatus according to claim 7, wherein the information guiding unit includes an absolute coordinate display unit for displaying the position information, the travel information and the danger information as a graphic display.

12. The apparatus according to claim 7, wherein the information guiding unit includes a voice guidance unit for acoustically informing of the position information, the travel information and the danger information.

13. The apparatus according to claim 12, wherein the voice guidance unit includes:
a voice memory for storing a data in voice;
a digital-to-analog converter for converting the data in voice to an analog signal;
a low frequency amplifier for amplifying the analog signal and outputting it; and
a speaker for converting the amplified analog signal to an audible signal.

* * * * *